United States Patent
Kim

(10) Patent No.: US 10,840,962 B2
(45) Date of Patent: Nov. 17, 2020

(54) ELECTRONIC DEVICE AND GRIP RECOGNITION METHOD THEREOF

(71) Applicant: Samsung Electronics Co., Ltd., Gyeonggi-do (KR)

(72) Inventor: Sanguk Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/686,509

(22) Filed: Aug. 25, 2017

(65) Prior Publication Data
US 2018/0062684 A1    Mar. 1, 2018

(30) Foreign Application Priority Data
Sep. 1, 2016  (KR) .................. 10-2016-0112743

(51) Int. Cl.
| | |
|---|---|
| H04W 52/36 | (2009.01) |
| H04W 52/38 | (2009.01) |
| H04B 1/3827 | (2015.01) |
| H04W 52/28 | (2009.01) |
| H01Q 1/24 | (2006.01) |
| H04W 52/14 | (2009.01) |

(52) U.S. Cl.
CPC ........... *H04B 1/3838* (2013.01); *H01Q 1/245* (2013.01); *H04W 52/283* (2013.01); *H04W 52/367* (2013.01); *H04M 2250/12* (2013.01); *H04W 52/146* (2013.01); *H04W 52/288* (2013.01)

(58) Field of Classification Search
CPC .................... H04W 52/367; H04W 52/0254
See application file for complete search history.

(56) References Cited

U.S. PATENT DOCUMENTS

| | | | | |
|---|---|---|---|---|
| 2003/0064761 | A1* | 4/2003 | Nevermann | ......... H04B 1/3838 455/572 |
| 2004/0204016 | A1* | 10/2004 | Sakamoto | ......... H04W 52/0254 455/550.1 |
| 2011/0250928 | A1 | 10/2011 | Schlub et al. | |

(Continued)

FOREIGN PATENT DOCUMENTS

| | | |
|---|---|---|
| CN | 103339796 A | 10/2013 |
| CN | 104113904 A | 10/2014 |

(Continued)

OTHER PUBLICATIONS

European Search Report dated Dec. 4, 2017.
Chinese Search Report dated Aug. 4, 2020.

*Primary Examiner* — Dong-Chang Shiue
(74) *Attorney, Agent, or Firm* — Cha & Reiter, LLC.

(57) ABSTRACT

An electronic device and a grip recognition method for reducing the SAR of the electronic device are provided. The electronic device of the present disclosure includes an antenna, a coupler, a processor electrically coupled to the antenna and the coupler, and a memory electrically coupled to the processor. The memory stores instructions that, when executed by the processor, cause the processor to detect a change of a transmit power value using the coupler during transmission of a radio signal through the antenna. The instructions further cause the processor to determine whether the electronic device is being gripped based on the change of the transmit power value.

12 Claims, 9 Drawing Sheets

(56) References Cited

U.S. PATENT DOCUMENTS

| | | | |
|---|---|---|---|
| 2012/0077538 A1* | 3/2012 | Yun | H04B 1/3838 |
| | | | 455/522 |
| 2012/0190398 A1 | 7/2012 | Leukkunen | |
| 2012/0206556 A1* | 8/2012 | Yu | H04M 1/00 |
| | | | 348/14.02 |
| 2013/0193756 A1* | 8/2013 | Fukaya | H02J 7/025 |
| | | | 307/29 |
| 2014/0361979 A1* | 12/2014 | Woo | H01Q 1/243 |
| | | | 345/156 |
| 2014/0370830 A1 | 12/2014 | Steer | |
| 2015/0201385 A1 | 7/2015 | Mercer et al. | |
| 2015/0222312 A1 | 8/2015 | Shi et al. | |
| 2015/0372656 A1* | 12/2015 | Mow | H03H 7/38 |
| | | | 455/77 |
| 2015/0382307 A1* | 12/2015 | Harper | H04W 52/246 |
| | | | 455/103 |
| 2016/0164563 A1* | 6/2016 | Khawand | H04B 1/3838 |
| | | | 455/127.2 |
| 2016/0211876 A1* | 7/2016 | Yamamoto | H04B 1/3838 |
| 2017/0155280 A1* | 6/2017 | Okamoto | H02J 50/10 |
| 2017/0179988 A1* | 6/2017 | Caballero | H04R 3/00 |
| 2017/0356980 A1* | 12/2017 | Islam | G01S 5/0289 |

FOREIGN PATENT DOCUMENTS

| | | |
|---|---|---|
| CN | 105900498 A | 8/2016 |
| CN | 107994956 A | 5/2018 |
| CN | 108777744 A | 11/2018 |
| EP | 2 487 967 A2 | 8/2012 |
| EP | 2 814 292 A1 | 12/2014 |
| WO | 2016/003744 A1 | 1/2016 |

* cited by examiner

ELECTRONIC DEVICE AND GRIP RECOGNITION METHOD THEREOF

CLAIM OF PRIORITY

This application claims priority from and the benefit under 35 U.S.C. § 119(a) of Korean Patent Application No. 10-2016-0112743 filed on Sep. 1, 2016, which is hereby incorporated by reference for all purposes as if fully set forth herein.

TECHNICAL FIELD

The present disclosure relates to an electronic device and a grip recognition method for reducing the Specific Absorption Rate (SAR) of the electronic device.

BACKGROUND

A high-power antenna is likely to have a high Specific Absorption Rate (SAR), which is a measurement of the amount of radio frequency energy absorbed by the human body. Typically, SAR should be limited to be below a certain threshold, as dictated by the relevant safety standards. For example, if the SAR measured at the antenna of an electronic device is greater than that the threshold specified by the safety standards, the electronic device has to be programmed to operate the antenna at limited power so that the electronic device can be deemed safe for human use. However, constantly operating the antenna at reduced power also has disadvantages. One disadvantage may be that the electronic device may not have the maximum antenna range allowed by the antenna. Therefore, when the SAR of an antenna exceeds a safe level, it may be desirable to operate the antenna at maximum power when the user is not near the device, and reduce power once the electronic device detects the user to be nearby. One approach to accomplishing this goal is to determine by means of a grip sensor whether the electronic device is being gripped and, if so, decrease the transmit power of the antenna, thereby reducing the SAR when the user is near the electronic device.

However, integrating grip sensor into the electronic device entails increasing circuit complexity and manufacturing costs. Furthermore, the grip sensor may be mounted such that one of its conductive lines may be connected to the Radio Frequency (RF) signal line of the antenna, resulting in potential performance degradation of the antenna.

SUMMARY

The present disclosure solves the above problems and aims to provide an electronic device and grip recognition method thereof that is capable of detecting a change in the transmit power of an antenna by means of a coupler that measures the power flowing to the antenna.

In accordance with an aspect of the present disclosure, an electronic device is provided. The electronic device includes an antenna, a coupler, a processor electrically coupled to the antenna and the coupler, and a memory electrically coupled to the processor. The memory stores instructions that, when executed by the processor, cause the processor to use the coupler to detect a change of a transmit power value during transmission of a radio signal through the antenna. The instructions further cause the processor to determine whether the electronic device is being gripped based on the change of the transmit power value.

In accordance with another aspect of the present disclosure, a grip recognition method of an electronic device is provided. The grip recognition method includes detecting a change of a transmit power value of an antenna using a coupler during transmission of a radio signal through the antenna and determining whether the electronic device is being gripped based on the change of the transmit power value.

DETAILED DESCRIPTION

Figure 1:
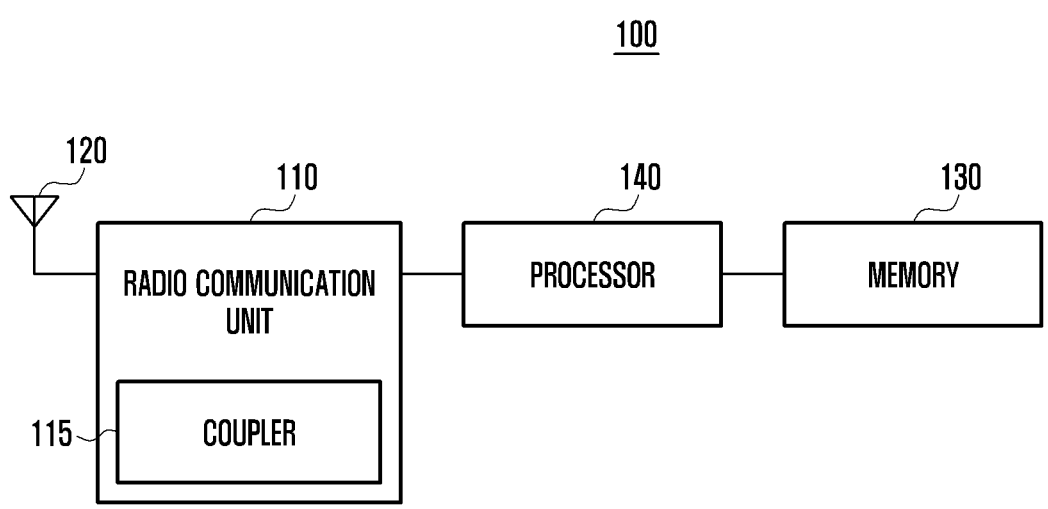
FIG. 1 is a block diagram illustrating a configuration of an electronic device according to one embodiment of the present disclosure.

Hereinafter, the present disclosure is described with reference to the accompanying drawings. Although various exemplary embodiments are illustrated in the drawings and described in the related detailed descriptions, the present disclosure may have various modifications and additional embodiments. Thus, the present disclosure are not limited to specific implementations disclosed herein and it should be understood that the present disclosure includes all suitable modifications and/or equivalents and substitutes. In connection with descriptions of the drawings, similar components are designated by the same reference numeral.

In various embodiments of the present disclosure, the terms such as "include," "have," "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1," "2," "first," or "second" used in various embodiments of the present disclosure may designate various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or an additional component may exist between the component and another component. On the other hand, when it is stated that a component is "directly coupled to" or "directly connected to" another component, additional components do not exist between the component and another component. In the present disclosure, the expression "configured (or set) to do" may be used interchangeably with, for example, "suitable for doing," "having the capacity to do," "designed to do," "adapted to do," "made to do," or "capable of doing." The expression "configured (or set) to do" may not necessarily be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., CPU or application processor or any other processing circuitry) that may execute one or more software programs stored in a memory device to perform corresponding functions.

The terms used in describing various embodiments of the present disclosure are only exemplary terms for describing specific embodiments and do not limit the various embodiments of the present disclosure. Singular forms are intended to include plural forms, and vice versa, unless the context clearly indicates otherwise.

Unless defined differently, all terms used herein, which include technical terminologies or scientific terminologies, have the same meaning as that understood by a person skilled in the art to which the present disclosure belongs. Such terms as those defined in a general-purpose dictionary are to be interpreted to have their plain meanings or their meanings in the context of the relevant field of art, and are not to be interpreted to have excessively formal or specialized meanings unless clearly indicated in the present description.

According to various embodiments, examples of the electronic device may include a smartphone, a tablet Personal Computer (PC), a mobile phone, a video phone, an electronic book reader, a desktop PC, a laptop PC, a netbook computer, a workstation, a server, a Personal Digital Assistant (PDA), a Portable Multimedia Player (PMP), an MP3 player, a medical device, a camera, and a wearable device, or the like, but is not limited thereto. Examples of the wearable device may include an accessory type device (such as, watch, ring, bracelet, ankle bracelet, necklace, glasses, contact lens, and Head-Mount Device (HMD)), a textile or clothes type device (such as electronic clothes), a body-attached type (such as skin pad and tattoo), and a bio-implemented type, or the like, but is not limited thereto. According to an embodiment, examples of the electronic device may include a television, a Digital Video Disc (DVD) player, an audio player, a refrigerator, an air conditioner, a cleaner, an oven, a microwave oven, a laundry machine, an air purifier, a set-top box, a home automation control panel, a security control panel, a media box (such as Samsung HomeSync™, apple TV™, and google TV™), a game console (such as Xbox™ and PlayStation™), an electronic dictionary, an electronic key, a camcorder, and an electronic frame, or the like, but is not limited thereto.

According to an embodiment, examples of the electronic device may include a medical device (such as portable medical sensors (including glucometer, heart rate sensor, tonometer, and body thermometer), Magnetic Resonance Angiography (MRA) device, Magnetic Resonance Imaging (MRI) device, Computed Tomography (CT) device, camcorder, and microwave scanner), a navigation device, a Global navigation Satellite System (GNSS), an Event Data Recorder (EDR), a Flight Data Recorder (FDR), an automotive infotainment device, marine electronic equipment (such as marine navigation system and gyro compass), aviation electronics (avionics), an automotive head unit, an industrial or household robot, an Automatic Teller Machine (ATM), a Point Of Sales (POS) terminal, and an Internet-of-Things (IoT) device (such as electric bulb, sensor, sprinkler system, fire alarm system, temperature controller, street lamp, toaster, fitness equipment, hot water tank, heater, and boiler), or the like, but is not limited thereto.

According to an embodiment, examples of the electronic device may include furniture, a building/structure, a part of a vehicle, an electronic board, an electronic signature receiving device, a projector, and a sensor (such as water, electricity, gas, and electric wave meters), or the like, but is not limited thereto. According to various embodiments, the electronic device may be flexible or a combination of at least two of the aforementioned devices. According to an embodiment, the electronic device is not limited to the aforementioned devices.

In the disclosure, the term "user" may denote a person who uses the electronic device or a device (e.g., artificial intelligent electronic device) which uses the electronic device.

FIG. 1 is a block diagram illustrating a configuration of an electronic device according to one embodiment of the present disclosure.

In reference to FIG. 1, the electronic device 100 may include a radio communication unit 110, a memory 130, and a processor 140. The processor 140 is electrically connected to the radio communication unit 110 and the memory 130 for communicating signals therebetween. In particular, the processor 140 may transmit a signal for controlling the radio communication unit 110 and the memory 130. The processor 140 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer (or a general purpose processor) accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to one embodiment of the present disclosure, the electronic device 100 may be clad in a metal housing. However, the present disclosure is not so limited.

According to one embodiment of the present disclosure, the electronic device 100 may transmit or receive signals with another electronic device by means of the radio communication unit 110. In other words, the radio communication unit 110 may allow the electronic device 100 to transmit or receive signals with other electronic devices.

According to one embodiment of the present disclosure, the electronic device 100 may be provided with an antenna 120 for transmitting and receiving radio signals.

Although FIG. 1 depicts the electronic device 100 with one antenna, the electronic device of the present disclosure is not so limited, and it may include a plurality of antennas for transmitting and receiving signaling in the same frequency band or different frequency bands.

The radio communication unit 110 may include circuitry for radio communication. The circuitry may include a coupler 115 for measuring the power value of the antenna 120.

According to one embodiment of the present disclosure, the coupler 115 may detect changes of the transmit power value at the antenna 120.

According to one embodiment of the present disclosure, the memory 130 may store a threshold value for use in grip recognition determination. The memory 130 may also store another threshold value to measure whether the SAR of the antenna 120 exceeds safety levels. If the SAR of the antenna 120 exceeds safety levels, the transmit power value of the antenna 120 may be limited.

The memory 130 may also store a power level table mapping transmit power levels to distances between the electronic device 100 and an external object, such as a user, so that the transmit power value of the electronic device 100 can be adjusted based on the power level table.

According to one embodiment of the present disclosure, the processor 140 may detect a change of the transmit power value using the coupler 115 during the operation of the antenna 120 (e.g. during the transmission or reception of radio signals). For example, the processor 140 may detect the approach or contact of an external object (e.g. dielectric object or conductive object, or a user) to the antenna 120. Upon detection of the approach or contact of the external object, the processor 140 may detect a change of the transmit power value by means of the coupler 115.

The processor 140 may determine whether the changed transmit power value is greater than a predetermined threshold. If it is determined that the changed transmit power value is greater than the threshold, the processor 140 may determine that the electronic device 100 is being gripped. Accordingly, the processor 140 may activate a power management mode of the antenna 120.

According to one embodiment of the present disclosure, the processor 140 may detect the distance between the electronic device 100 and the external object based on the change of the transmit power value measured by the coupler 115. The processor 140 may retrieve the transmit power level corresponding to the measured distance from the power level table stored in the memory 130. The processor 140 may then adjust the transmit power value of the antenna 120 to the retrieved transmit power level.

Figure 2:
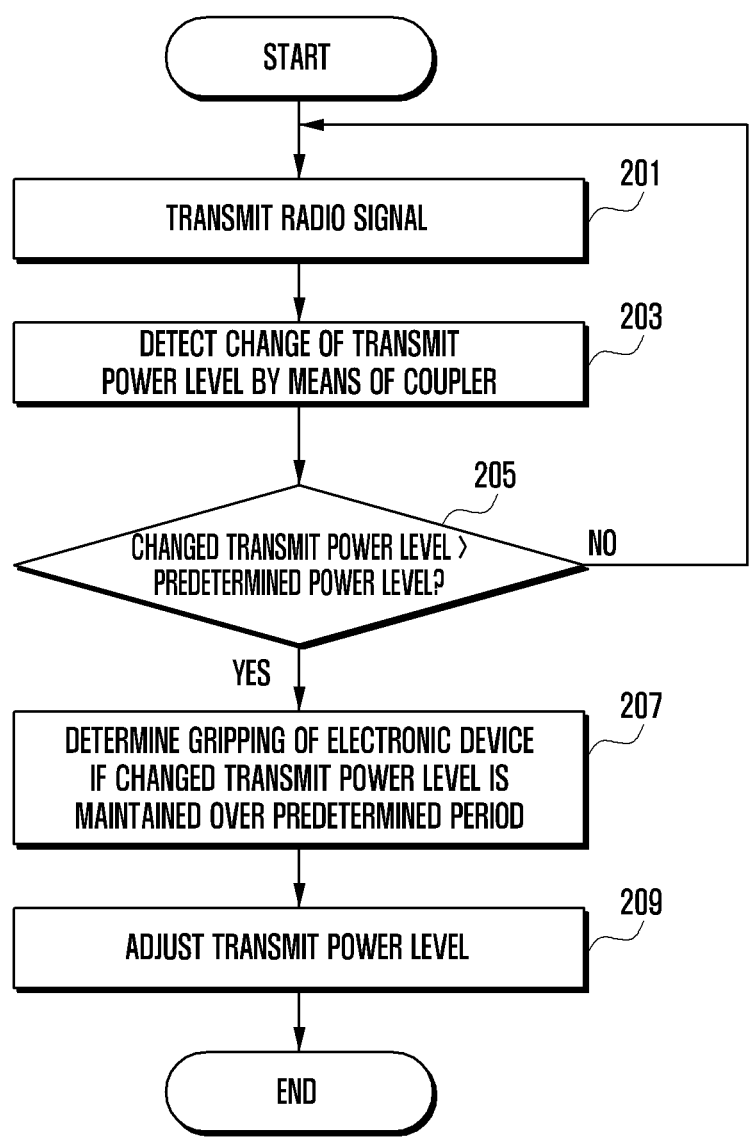
FIG. 2 is a flowchart illustrating a grip recognition method of an electronic device according to one embodiment of the present disclosure.

FIG. 2 is a flowchart illustrating a grip recognition method of an electronic device according to various embodiments of the present disclosure.

In reference to FIG. 2, the processor 140 may transmit radio signals through the antenna 120 at operation 201. According to one embodiment of the present disclosure, the processor 140 may transmit radio signals through the antenna 120 at a preconfigured transmit power value.

While the radio signals are transmitted at the preconfigured transmit power value, the processor 140 may then detect a change of the transmit power value by means of the coupler 115 at operation 203.

For example, if the processor 140 receives an input indicating the approach or contact of an external object (e.g., dielectric object or conductive object) to the antenna 120, and it may check for the change of the transmit power value by means of the coupler 115.

The processor 140 may determine at operation 205 whether the changed transmit power value is higher than a predetermined threshold. The changed transmit power value may be determined based on the detected change of the transmit power value and the preconfigured transmit power value.

According to one embodiment of the present disclosure, the processor 140 may convert the RF signal to a digital value for convenience. The digital value may indicate the transmit power level of the RF signal. In this case, the processor 140 may determine whether the converted digital value corresponding to the RF signal is greater than a predetermined threshold.

According to one embodiment of the present disclosure, the predetermined threshold may be used to determine whether the electronic device is being gripped by a user. Accordingly, the predetermined threshold may be used to restrict the transmit power value when the electronic device is being gripped, so that the SAR of the antenna 120 is within safe levels.

If it is determined that the changed transmit power value is greater than the predetermined threshold, the processor 140 may determine whether the changed power level is maintained over a predetermined period. If so, it may be determined at operation 207 that the electronic device is being gripped.

If it is determined that the electronic device is being gripped, the processor 140 may activate a power restriction mode of the antenna 120 at operation 209 to adjust the transmit power level of the antenna 120.

According to one embodiment of the present disclosure, the power restriction mode may be an operation mode where the transmit power value for radio communication is restricted, such that the SAR of the antenna 120 is within the safety standard.

If it is determined that the changed transmit power value is not greater than the predetermined threshold, the processor 140 may return to operation 201.

Figure 3:
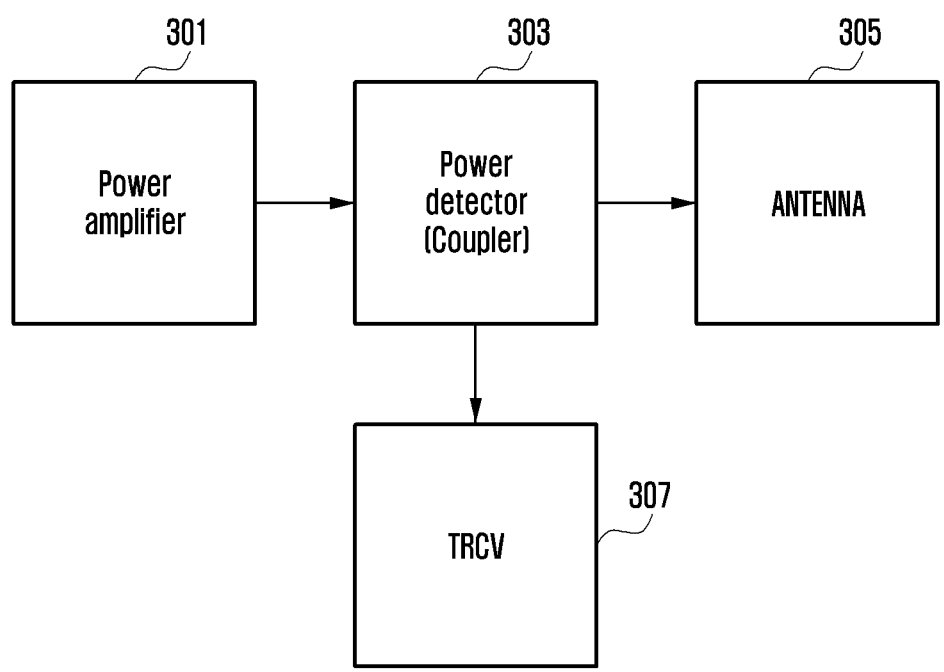
FIG. 3 is a block diagram illustrating a configuration of mechanism for detecting a change of the transmit power value of an electronic device according to one embodiment of the present disclosure.

FIG. 3 is a block diagram illustrating a configuration of a mechanism for detecting a change of the transmit power value of an electronic device according to various embodiments of the present disclosure.

In reference to FIG. 3, the power amplifier (PA) 301 is a device for amplifying the RF signal detected by the power detector 303. According to one embodiment, output power and consumption current may change by changes to the output load impedance of the PA 301.

The power detector 303 may be referred to as a coupler and be arranged close to the antenna 305. The antenna 305 may be the same as the antenna 120 in FIG. 1. The power detector 303 may detect a coupling signal generated on the RF line of the antenna 305. The power detector 303 may receive the output power of the PA 301. Accordingly, the power detector 303 may also detect a change in the output power level of the PA 301.

The antenna 305 (e.g., antenna 120 of FIG. 1) is configured to transmit RF signals. According to one embodiment of the present disclosure, the impedance of the antenna 305 may be distorted when an external object (e.g., dielectric object and conductive object) is close to the antenna 305, compared to when no external object is close to the antenna 305.

According to one embodiment, the size of the impedance may vary according to the distance between the antenna 305 and the external object.

The transceiver (TRCV) 307 may convert an RF signal detected by the power detector 303 to a digital value. The digital value may indicate the transmit power level of the RF signal. If the digital value corresponding to the RF signal is greater than a predetermined threshold, the processor 140 may determine that the SAR of the antenna 305 is outside safe levels. The processor 140 may then control the antenna 305 to operate in the power restriction mode, e.g., transmit power back-off mode, such that the SAR of the antenna 305 is within the safety standard.

Figure 4:
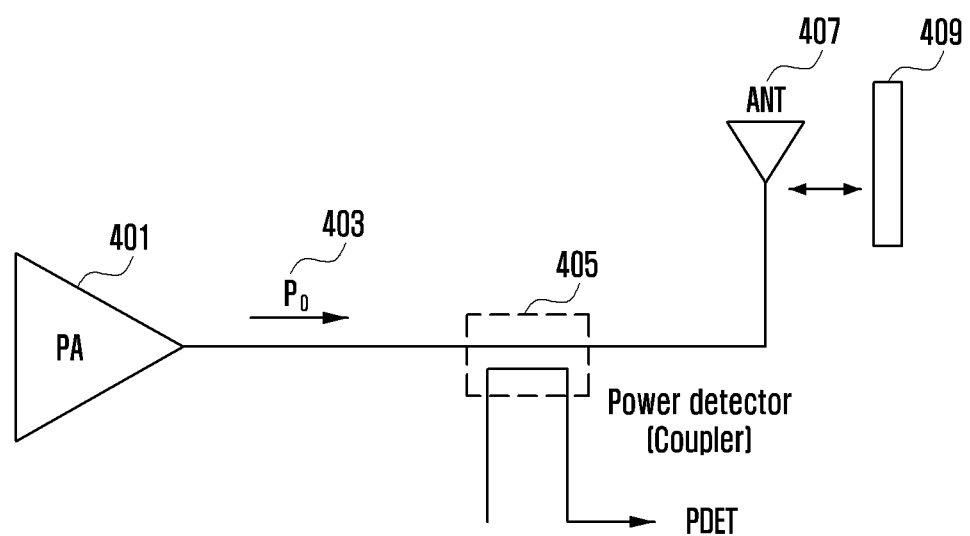
FIG. 4 is a circuit diagram illustrating a circuit for detecting a change of the transmit power value according to one embodiment of the present disclosure.

FIG. 4 is a circuit diagram illustrating a circuit for detecting a change of the transmit power value according to one embodiment of the present disclosure.

Figure 5:
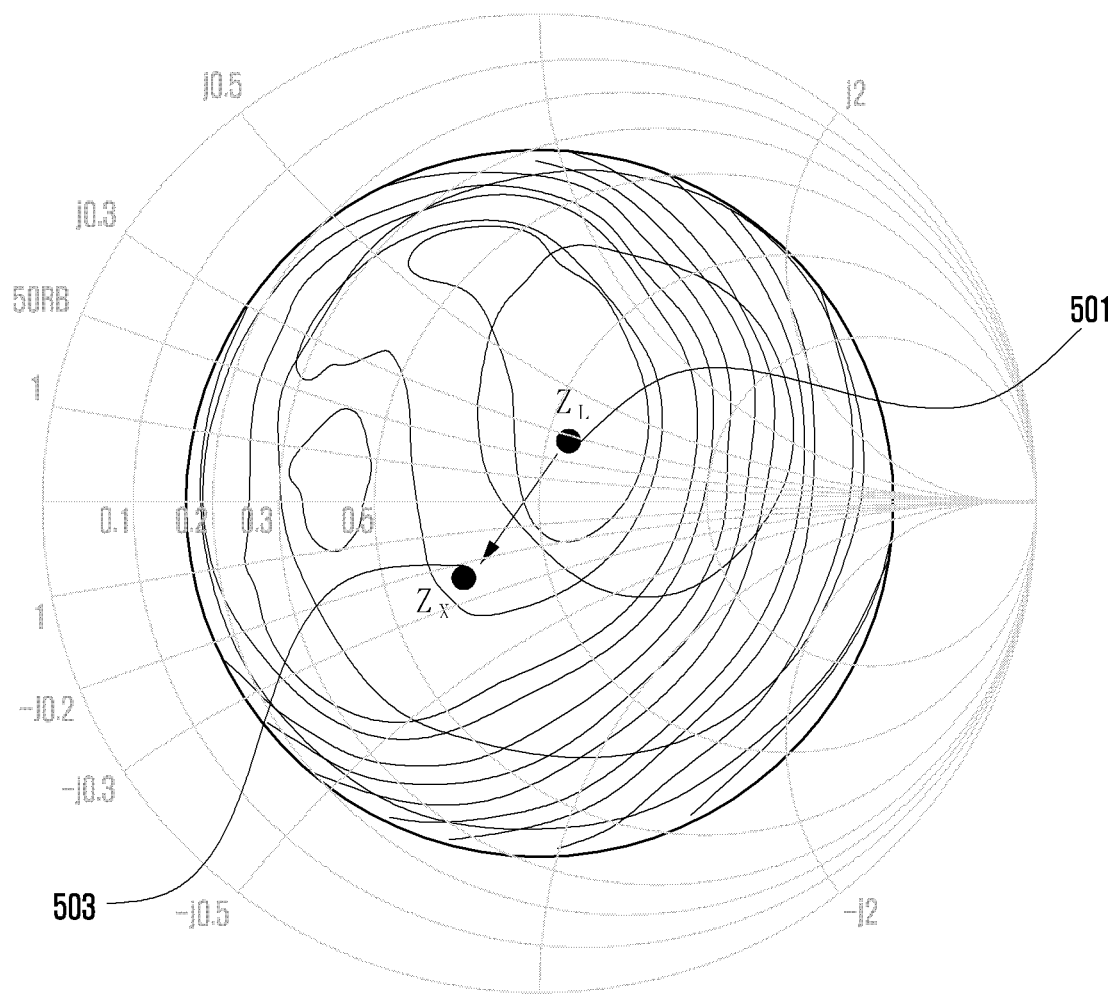
FIG. 5 is a diagram illustrating a Smith chart showing change of impedance according to one embodiment of the present disclosure.

FIG. 5 is a diagram illustrating a Smith chart showing change of impedance according to one embodiment of the present disclosure.

As illustrated in FIGS. 4 and 5, when the load impedance viewed from the PA 401 to the antenna 407 is $Z_L$ 501 as shown in FIG. 5, the transmit power level is $P_0$ 403 as shown in FIG. 4.

If an external object (e.g., dielectric object and conductive object) approaches or contacts the antenna 407, the load impedance viewed from the PA 401 to the antenna 407 may be changed from $Z_L$ 501 to $Z_X$ 503. As the load impedance is changed from $Z_L$ 501 to $Z_X$ 503, the transmit power value of the PA 401 may be changed from $P_0$ 403 to $P_X$ (not shown).

According to one embodiment of the present disclosure, a power detector 405 may detect the change of the transmit power value. The transmit power value may be converted to a digital value, and the converted digital value may be used to restrict the power supplied to the antenna 407 (e.g. the antennas 120 and 305) such that the SAR of the antenna is within the safety standard.

Figure 6:
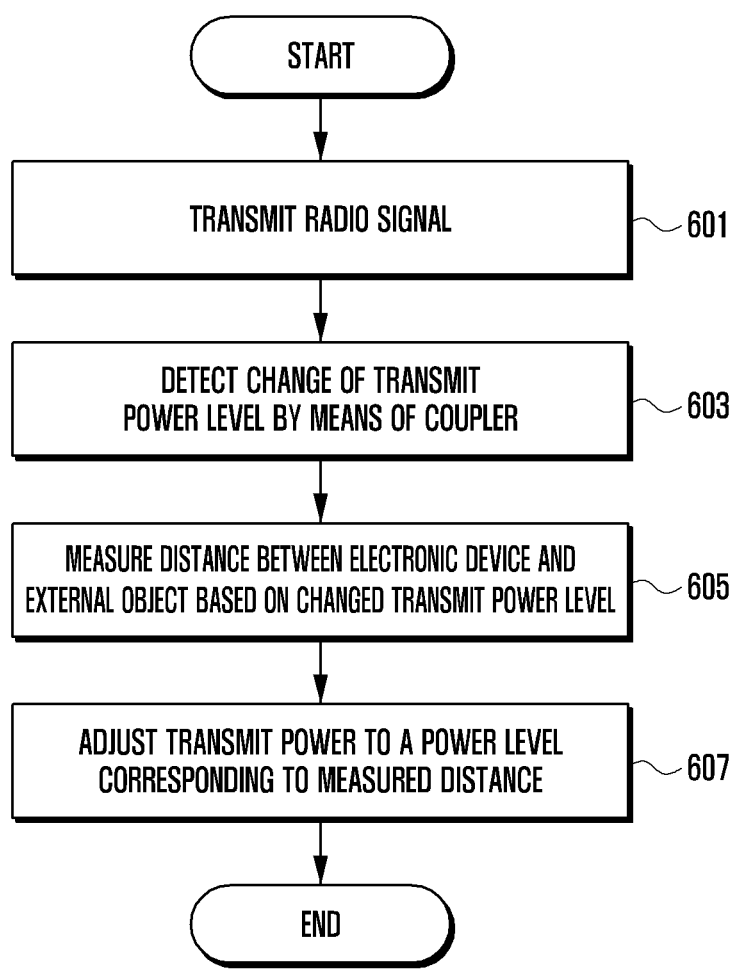
FIG. 6 is a flowchart illustrating a grip recognition method of an electronic device according to one embodiment of the present disclosure.

FIG. 6 is a flowchart illustrating a grip recognition method of an electronic device according to one embodiment of the present disclosure.

In reference to FIG. 6, the processor 140 may transmit a radio signal at a preconfigured transmit power value at operation 601. During the transmission of the radio signal, the processor 140 may detect change of the transmit power value by means of a coupler at operation 603.

Because operations 601 and 603 of FIG. 6 are similar to operations 201 and 203 of FIG. 2, similar detailed descriptions thereof are omitted herein.

The processor 140 may measure at operation 605 the distance between the electronic device and an external object based on the changed transmit power value.

The processor 140 may then adjust at operation 607 the transmit power value of the antenna to the transmit power level corresponding to the measured distance.

According to one embodiment of the present disclosure, the memory 130 may store a power level table mapping transmit power levels to distances between the electronic device and the external object. The processor 140 may retrieve a transmit power level corresponding to the measured distance from the power level table stored in the memory 130. The processor 140 may then adjust the transmit power value to the retrieved transmit power level.

For example, the processor 140 may adjust the transmit power value to a first transmit power level (e.g., 80% of preconfigured power level) when the distance between the electronic device and the external object is in a first range and to a second transmit power level (e.g., 60% of preconfigured power level) when the distance is in a second range.

Figure 7:
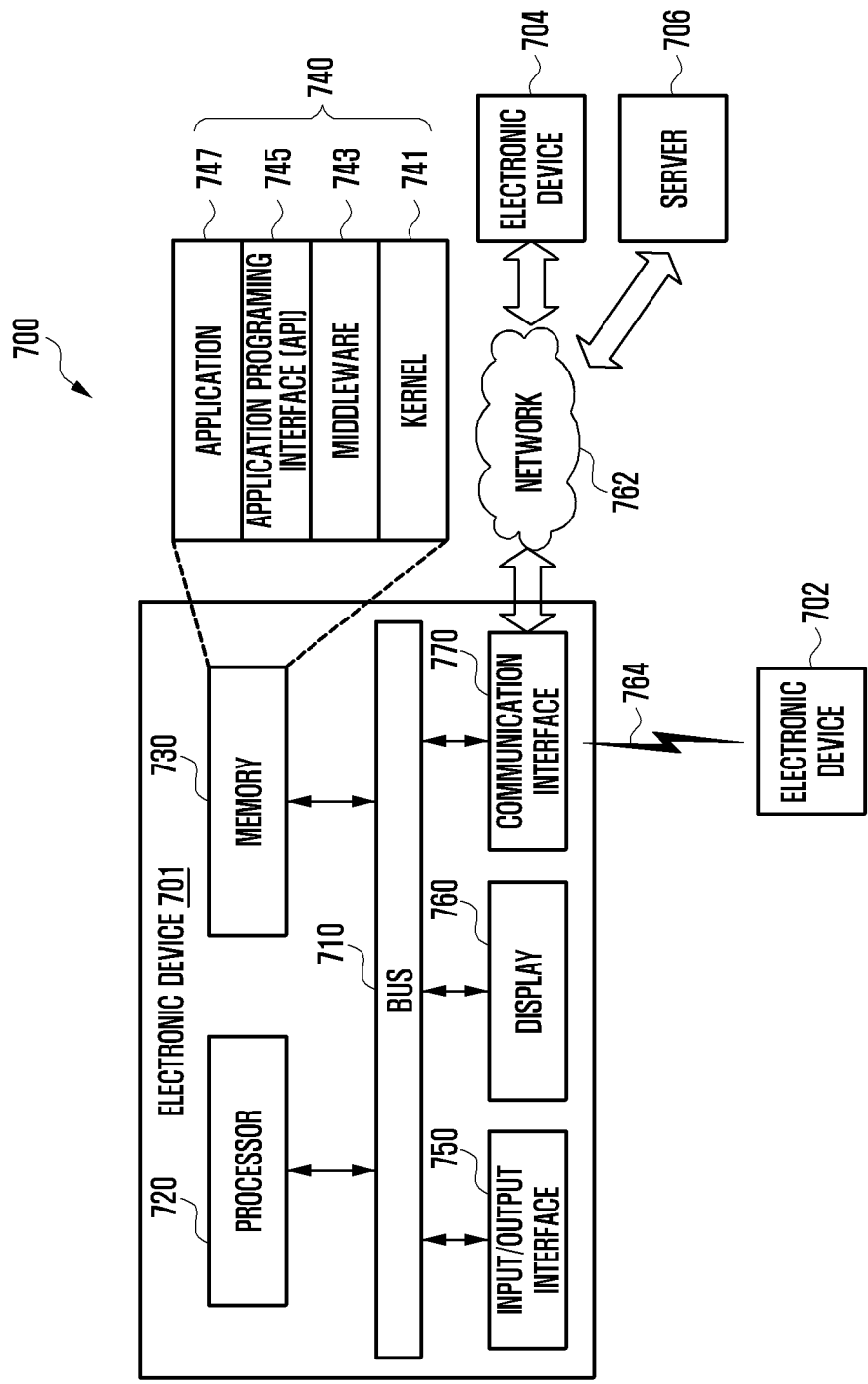
FIG. 7 is a diagram illustrating an electronic device in a network environment according to one embodiment of the present disclosure.

FIG. 7 is a diagram illustrating an electronic device in a network environment according to one embodiment of the present disclosure.

Referring to FIG. 7, electronic device (e.g., an electronic device 701, a first external device 702 and a second external device 704) and/or server 706 may be connected with network 762 through short-range communication 764.

The electronic device 701, in a network environment 700, includes a bus 710, a processor (e.g., including processing circuitry) 720, a memory 730, an input/output interface (e.g., including input/output circuitry) 750, a display 760, and a communication interface (e.g., including communication circuitry) 770. According to some embodiments, the electronic device 701 may omit at least one of the components or further include another component.

The bus 710 may be a circuit connecting the above described components 710-770 and transmitting communication (e.g., a control message or data) between the above described components.

The processor 720 may include various processing circuitry, such as, for example, and without limitation one or more of a dedicated processor, a central processing unit (CPU), application processor (AP) or communication processor (CP). For example, the processor 720 may control at least one component of the electronic device 701 and/or execute calculation relating to communication or data processing.

The memory 730 may include volatile and/or non-volatile memory. For example, the memory 730 may store command or data relating to at least one component of the electronic device 701. According to some embodiment, the memory 730 may store software and/or program 740. For example, the program 740 may include a kernel 741, middleware 743, an application programming interface (API) 745, and/or an application 747 and so on. At least one portion of the kernel 741, the middleware 743 and the API 745 may be defined as operating system (OS).

The kernel 741 controls or manages system resources (e.g., the bus 710, the processor 720, or the memory 730) used for executing an operation or function implemented by the remaining other program, for example, the middleware 743, the API 745, or the application 747. Further, the kernel 741 provides an interface for accessing individual components of the electronic device 701 from the middleware 743, the API 745, or the application 747 to control or manage the components.

The middleware 743 performs a relay function of allowing the API 745 or the application 747 to communicate with the kernel 741 to exchange data. Further, in operation requests received from the application 747, the middleware 743 performs a control for the operation requests (e.g., scheduling or load balancing) by using a method of assigning a priority, by which system resources (e.g., the bus 710, the processor 720, the memory 730 and the like) of the electronic device 701 may be used, to the application 747.

The API 745 is an interface by which the application 747 may control a function provided by the kernel 741 or the middleware 743 and includes, for example, at least one interface or function (e.g., command) for a file control, a window control, image processing, or a character control.

The input/output interface 750 may include various input/output circuitry configured to provide an interface to transmit command or data input by a user or another external device to another component(s) of the electronic device 701. Further, the input/output interface 750 may output the command or data received from the another component(s) of the electronic device 701 to the user or the another external device.

The display 760 may include, for example, liquid crystal display (LCD), light emitting diode (LED), organic LED (OLED), or micro electro mechanical system (MEMS) display, or electronic paper display, or the like, but is not limited thereto. The display 760 may display, for example, various contents (text, image, video, icon, or symbol, and so on) to a user. The display 760 may include a touch screen, and receive touch, gesture, approaching, or hovering input using a part of body of the user.

The communication interface 770 may include various communication circuitry configured to set communication of the electronic device 701 and external device (e.g., a first external device 702, a second external device 704, or a server 706). For example, the communication interface 770 may be connected with the network 762 through wireless communication or wire communication and communicate with the external device (e.g., the first external device 702, the second external device 704 or the server 706).

Wireless communication may use, as cellular communication protocol, at least one of LTE (long-term evolution), LTE-A (LTE Advance), CDMA (code division multiple access), WCDMA (wideband CDMA), UMTS (universal mobile telecommunications system), WiBro (Wireless Broadband), GSM (Global System for Mobile Communications), and the like, for example. A short-range communication 764 may include, for example, at least one of Wi-Fi, Bluetooth, Near Field Communication (NFC), Magnetic Secure Transmission or near field Magnetic data Stripe Transmission (MST), and Global Navigation Satellite System (GNSS), and the like. The GNSS may include at least one of, for example, a Global Positioning System (GPS), a Global navigation satellite system (Glonass), a Beidou Navigation Satellite System (hereinafter, referred to as "Beidou"), and Galileo (European global satellite-based navigation system). Hereinafter, the "GPS" may be interchangeably used with the "GNSS" in the disclosure. Wired communication may include, for example, at least one of USB (universal serial bus), HDMI (high definition multimedia interface), RS-232 (recommended standard-232), POTS (plain old telephone service), and the like. The network 762 may include telecommunication network, for example, at least one of a computer network (e.g., LAN or WAN), internet, and a telephone network.

Each of the first external device 702 and the second external device 704 may be same type or different type of device with the electronic device 701. According to some embodiment, the server 706 may include one or more group of servers. According to one embodiment, at least one portion of executions executed by the electronic device may be performed by one or more electronic devices (e.g., external electronic device 702, 704, or server 706). According to some embodiments, when the electronic device 701 should perform a function or service automatically, the electronic device 701 may request performing of at least one function to another device (e.g., external electronic device 702, 704, or server 706). The another device (e.g., external electronic device 702, 704, or server 706) may perform the requested function or additional function, and may transfer a result of the performance to the electronic device 701. The electronic device 701 may additionally process the received result to provide the requested function or service. For the above, cloud computing technology, distributed computing technology, or client-server computing technology may be used, for example.

Figure 8:
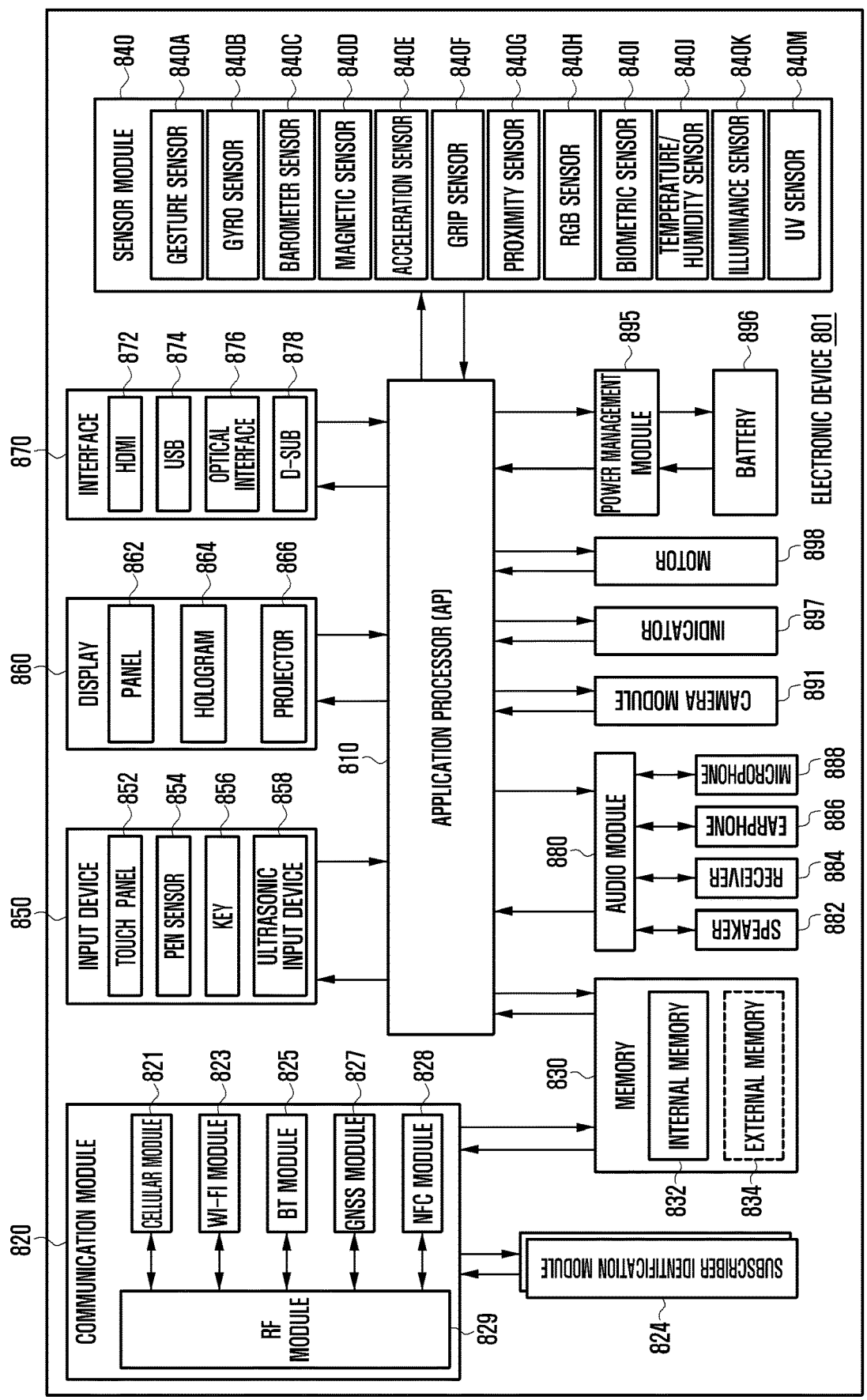
FIG. 8 is a block diagram illustrating a configuration of an electronic device according to one embodiment of the present disclosure.

FIG. 8 is a block diagram illustrating a configuration of an electronic device according to one embodiment of the present disclosure.

Referring to FIG. 8, an electronic device 801 may include, for example, a whole or a part of the electronic device 701 illustrated in FIG. 7. The electronic device 801 includes one or more APs (e.g., including processing circuitry) 810, a communication module (e.g., including communication circuitry) 820, a subscriber identification module (SIM) card 824, a memory 830, a sensor module 840, an input device (e.g., including input circuitry) 850, a display 860, an interface (e.g., including interface circuitry) 870, an audio module 880, a camera module 891, a power managing module 895, a battery 896, an indicator 897, and a motor 898.

The AP 810 may include various processing circuitry and operates an OS or an application program so as to control a plurality of hardware or software component elements connected to the AP 810 and execute various data processing and calculations including multimedia data. The AP 810 may be implemented by, for example, a system on chip (SoC). According to an embodiment, the application processor 810 may further include a graphics processing unit (GPU) and/or image signal processor. The AP 810 may include at least one portion of components illustrated in FIG. 8 (e.g., a cellular module 821). The AP 810 may load command or data received from at least one of another component (e.g., non-volatile memory), store various data in the non-volatile memory.

The communication module 820 may include the same or similar components with the communication interface 770 of FIG. 7. The communication module 820 may include various communication circuitry therein, such as, for example, and without limitation, a cellular module 821, a Wi-Fi module 823, a BT module 825, a GNSS module 827, a NFC module 828, and a radio frequency (RF) module 829.

The cellular module 821 provides a voice, a call, a video call, a short message service (SMS), or an internet service through a communication network (e.g., LTE, LTE-A, CDMA, WCDMA, UMTS, WiBro, GSM and the like). Further, the cellular module 821 may distinguish and authenticate electronic devices within a communication network by using a SIM (e.g., the SIM card 824). According to an embodiment, the cellular module 821 performs at least some of the functions which may be provided by the AP 810. For example, the cellular module 821 may perform at least some of the multimedia control functions. According to an embodiment, the cellular module 821 may include a CP.

Each of the Wi-Fi module 823, the BT module 825, the GNSS module 827, and the NFC module 828 may include, for example, a processor for processing data transmitted/received through the corresponding module.

According to one embodiment, at least part of the cellular module 821, the Wi-Fi module 823, the BT module 825, the GNSS module 827, and the NFC module 828 may be included in one integrated chip (IC) or one IC package.

The RF module 829 transmits/receives data, for example, an RF signal. Although not illustrated, the RF module 829 may include, for example, a transceiver, a power amp module (PAM), a frequency filter, a low noise amplifier (LNA), antenna and the like.

According to one embodiment, at least one of the cellular module 821, the Wi-Fi module 823, the BT module 825, the GNSS module 827, and the NFC module 828 may transmit/receive an RF signal through a separate RF.

The SIM card 824 may refer, for example, to a card including a SIM and may be inserted into a slot formed in a particular portion of the electronic device. The SIM card 824 includes unique identification information (e.g., integrated circuit card identifier (ICCID)) or subscriber information (e.g., international mobile subscriber identity (IMSI)).

The memory 830 (e.g., memory 730) may include an internal memory 832 and/or an external memory 834. The internal memory 832 may include, for example, at least one of a volatile memory (e.g., a random access memory (RAM), a dynamic RAM (DRAM), a static RAM (SRAM), a synchronous dynamic RAM (SDRAM), and the like), and a non-volatile Memory (e.g., a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, etc.), a hard drive, a solid state drive (SSD), etc.

According to an embodiment, the external memory 834 may further include a flash drive, for example, a compact flash (CF), a secure digital (SD), a micro-SD, a mini-SD, an extreme digital (xD), or a memory stick. The external memory 834 may be functionally connected to the electronic device 801 through various interfaces. According to an embodiment, the electronic device 801 may further include a storage device (or storage medium) such as a hard drive.

The sensor module 840 measures a physical quantity or detects an operation state of the electronic device 801, and converts the measured or detected information to an electronic signal. The sensor module 840 may include, for example, at least one of a gesture sensor 840A, a gyro sensor 840B, an atmospheric pressure (barometer) sensor 840C, a magnetic sensor 840D, an acceleration sensor 840E, a grip sensor 840F, a proximity sensor 840G, a color sensor 840H (e.g., red, green, and blue (RGB) sensor), a biometric sensor 840I, a temperature/humidity sensor 840J, an illuminance (e.g., light) sensor 840K, and a ultraviolet (UV) sensor 840M. Additionally or alternatively, the sensor module 840 may include, for example, an E-nose sensor, an electromyography (EMG) sensor, an electroencephalogram (EEG) sensor, an electrocardiogram (ECG) sensor, an infrared (IR) sensor, an iris sensor, a fingerprint sensor (not illustrated), and the like. The sensor module 840 may further include a control circuit for controlling one or more sensors included in the sensor module 840. In embodiments, the electronic device 801 is capable of including a processor, configured as part of the application processor 810 or a separate component, for controlling the sensor module 840. In this case, while the application processor 810 is operating in sleep mode, the processor is capable of controlling the sensor module 840.

The input device 850 may include various input circuitry, such as, for example, and without limitation, a touch panel 852, a (digital) pen sensor 854, a key 856, and an ultrasonic input device 858. For example, the touch panel 852 may recognize a touch input in at least one type of a capacitive type, a resistive type, an infrared type, and an acoustic wave type. The touch panel 852 may further include a control circuit. In the capacitive type, the touch panel 852 may recognize proximity as well as a direct touch. The touch panel 852 may further include a tactile layer. In this event, the touch panel 852 provides a tactile reaction to the user.

The (digital) pen sensor 854 may be implemented, for example, using a method identical or similar to a method of receiving a touch input of the user, or using a separate recognition sheet. The key 856 may include, for example, a physical button, an optical key, or a key pad. The ultrasonic input device 858 is a device which may detect an acoustic wave by a microphone (e.g., a microphone 888) through an input means generating an ultrasonic signal to identify data and may perform wireless recognition.

The display 860 (e.g., display 760) includes a panel 862, a hologram unit or device 864, and a projector 866. The panel 862 may be implemented to be, for example, flexible, transparent, or wearable. The panel 862 may also be incorporated into one module together with the touch panel 852. The According to one embodiment, the panel 862 may include a pressure sensor (or force sensor) capable of measuring the intensity of the pressure on the user's touch. The pressure sensor may be integrated with the touch panel 852, or may be implemented by one or more sensors separate from the touch panel 852. The hologram device 864 shows a stereoscopic image in the air by using interference of light. The projector 866 projects light on a screen to display an image. For example, the screen may be located inside or outside the electronic device 801.

The interface 870 may include various interface circuitry, such as, for example, and without limitation, a HDMI 872, an USB 874, an optical interface 876, and a D-subminiature (D-sub) 878. The interface 870 may be included in, for example, the communication interface 770 illustrated in FIG. 7. Additionally or alternatively, the interface 870 may include, for example, a mobile high-definition link (MHL) interface, an SD card/multi-media card (MMC), or an infrared data association (IrDA) standard interface.

The audio module 880 bi-directionally converts a sound and an electronic signal. At least some components of the audio module 880 may be included in, for example, the input/output interface 750 illustrated in FIG. 7. The audio module 880 processes sound information input or output through, for example, a speaker 882, a receiver 884, an earphone 886, the microphone 888 and the like.

The camera module 891 is a device which may photograph a still image and a video. According to an embodiment, the camera module 891 may include one or more image sensors (e.g., a front sensor or a back sensor), an image signal processor (ISP) or a flash (e.g., an LED or xenon lamp).

The power managing module 895 manages power of the electronic device 801. Although not illustrated, the power managing module 895 may include, for example, a power management integrated circuit (PMIC), a charger IC, or a battery or fuel gauge.

The PMIC may be mounted to, for example, an integrated circuit or a SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier and the like may be added.

The battery fuel gauge measures, for example, a remaining quantity of the battery 896, or a voltage, a current, or a temperature during charging. The battery 896 may store or generate electricity and supply power to the electronic device 801 by using the stored or generated electricity. The battery 896 may include a rechargeable battery or a solar battery.

The indicator 897 shows particular statuses of the electronic device 801 or a part (e.g., AP 810) of the electronic device 801, for example, a booting status, a message status, a charging status and the like. The motor 898 converts an electrical signal to a mechanical vibration. Although not illustrated, the electronic device 801 may include a processing unit (e.g., GPU) for supporting a module TV. The processing unit for supporting the mobile TV may process, for example, media data according to a standard of digital multimedia broadcasting (DMB), digital video broadcasting (DVB), media flow and the like.

Each of the components of the electronic device according to one or more embodiments may be implemented by one or more components and the name of the corresponding component may vary depending on a type of the electronic device. The electronic device according to one or more embodiments may include at least one of the above described components, a few of the components may be omitted, or additional components may be further included. Also, some of the components of the electronic device according to one or more embodiments may be combined to form a single entity, and thus may equivalently execute functions of the corresponding components before being combined.

Figure 9:
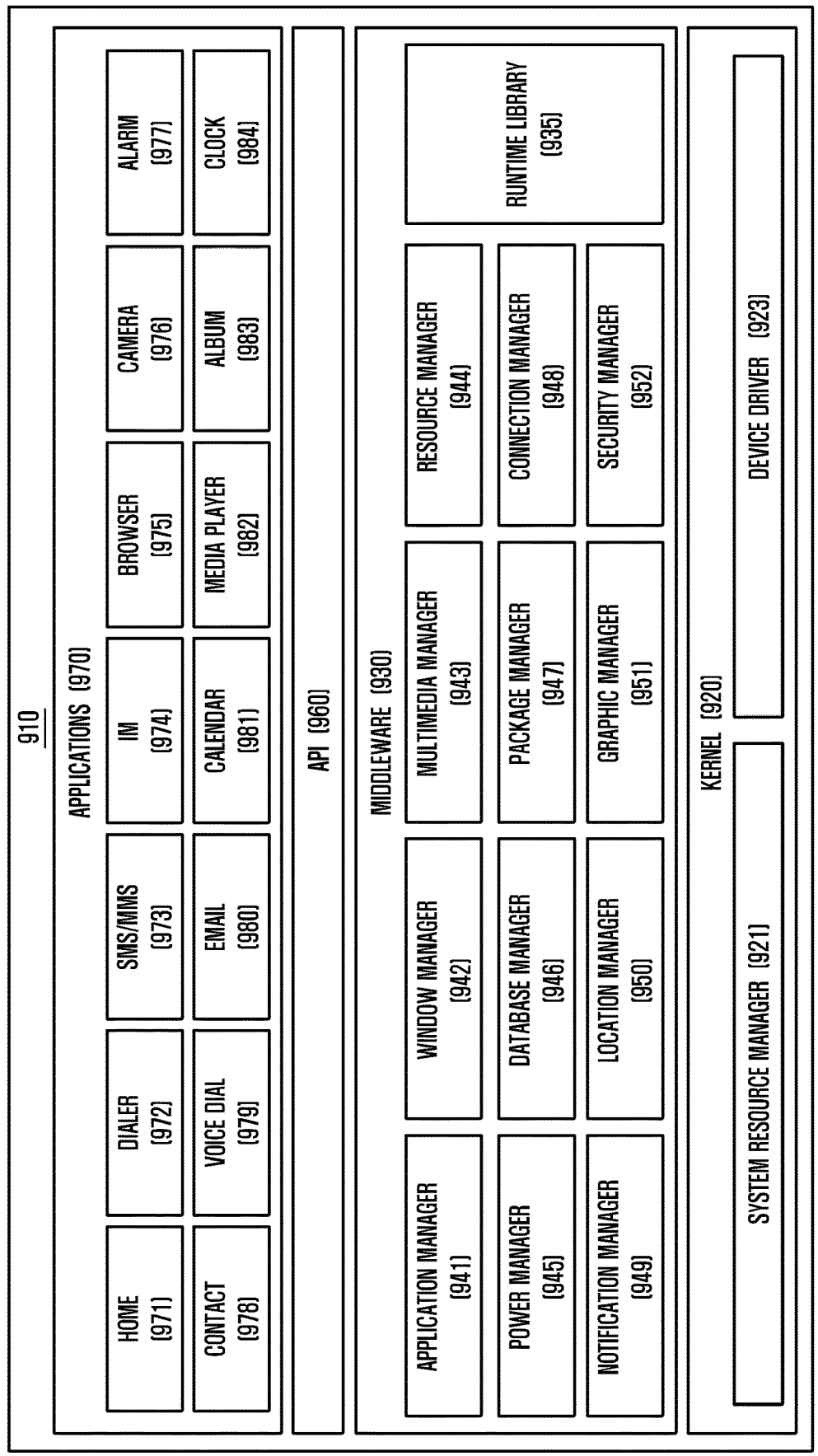
FIG. 9 is a block diagram illustrating a configuration of a program module according to one embodiment of the present disclosure.

FIG. 9 is a block diagram illustrating a configuration of a program module according to one embodiment of the present disclosure.

Referring to FIG. 9, a programming module 910 may be included, e.g. stored, in the electronic device 701, e.g. the memory 730, as illustrated in FIG. 7. At least a part of the programming module 910 (e.g., program 740) may be realized by software, firmware, hardware, and/or combinations of two or more thereof. The programming module 910 may include an OS that is implemented in hardware, e.g., the hardware 800 to control resources related to an electronic device, e.g., the electronic device 701, and/or various applications. e.g., application 747, driven on the OS. For example, the OS may be Android, iOS, Windows, Symbian, Tizen, Bada, and the like.

Referring to FIG. 9, the programming module 910 may include a kernel 920 (e.g., kernel 741), middleware 930 (e.g., middleware 743), an API 960 (e.g., API 745), and the applications 970 (e.g., application 747). At least part of the program module 910 may be preloaded on the electronic device or downloaded from a server (e.g., the external electronic device 702, 704, server 706, etc.).

The kernel 920 may include a system resource manager 921 and/or a device driver 923. The system resource manager 921 may control, allocate, and/or collect system resources. The system resource manager 921 may include, for example, a process manager, a memory manager, and a file system manager. The device driver 923 may include, for example, a display driver, a camera driver, a BT driver, a shared memory driver, a USB driver, a keypad driver, a Wi-Fi driver, and an audio driver. Further, according to an embodiment, the device driver 923 may include an inter-process communication (IPC) driver (not illustrated).

The middleware 930 may include a plurality of modules implemented in advance for providing functions commonly used by the applications 970. Further, the middleware 930 may provide the functions through the API 960 such that the applications 970 may efficiently use restricted system resources within the electronic apparatus. For example, as illustrated in FIG. 9, the middleware 930 may include at least one of a runtime library 935, an application manager 941, a window manager 942, a multimedia manager 943, a resource manager 944, a power manager 945, a database manager 946, a package manager 947, a connectivity (e.g., connection) manager 948, a notification manager 949, a location manager 950, a graphic manager 951, and a security manager 952.

The runtime library 935 may include a library module that a compiler uses in order to add a new function through a programming language while one of the applications 970 is being executed. According to an embodiment, the runtime library 935 may perform an input/output, memory management, and/or a function for an arithmetic function.

The application manager 941 may manage a life cycle of at least one of the applications 970. The window manager 942 may manage graphical user interface (GUI) resources used by a screen. The multimedia manager 943 may detect formats used for reproduction of various media files, and may perform encoding and/or decoding of a media file by using a codec suitable for the corresponding format. The resource manager 944 may manage resources such as a source code, a memory, and a storage space of at least one of the applications 970.

The power manager 945 may manage a battery and/or power, while operating together with a basic input/output system (BIOS), and may provide power information used for operation. The database manager 946 may manage generation, search, and/or change of a database to be used by at least one of the applications 970. The package manager 947 may manage installation and/or an update of an application distributed in a form of a package file.

For example, the connectivity manager 948 may manage wireless connectivity such as Wi-Fi or BT. The notification manager 949 may display and/or notify of an event, such as an arrival message, a promise, a proximity notification, and the like, in such a way that does not disturb a user. The location manager 950 may manage location information of an electronic apparatus. The graphic manager 951 may manage a graphic effect which will be provided to a user, and/or a user interface related to the graphic effect. The security manager 952 may provide all security functions used for system security and/or user authentication. According to an embodiment, when an electronic apparatus, e.g., the electronic device (or apparatus) 701, has a telephone call function, the middleware 930 may further include a telephony manager for managing a voice and/or video communication function of the electronic apparatus.

The middleware 930 may generate and use a new middleware module through various functional combinations of the aforementioned internal element modules. The middleware 930 may provide modules specialized according to types of OSs in order to provide differentiated functions. Further, the middleware 930 may dynamically remove some of the existing elements and/or add new elements. Accordingly, the middleware 930 may exclude some of the elements described in the various embodiments, further include other elements, and/or substitute the elements with elements having a different name and performing a similar function.

The API 960 is a set of API programming functions, and may be provided with a different configuration according to the OS. For example, in a case of Android or iOS, one API set may be provided for each of platforms, and in a case of Tizen, two or more API sets may be provided.

The applications 970 may include one or more applications for performing various functions, e.g., home 971, dialer 972, SMS/MMS 973, instant message (IM) 974, browser 975, camera 976, alarm 977, contact 978, voice dial 979, email 980, calendar 981, media player 982, album 983, clock 984, health care (e.g., an application for measuring amount of exercise, blood sugar level, etc.), and environment information (e.g., an application for providing atmospheric pressure, humidity, temperature, etc.), not shown.

According to an embodiment, the applications 970 are capable of including an application for supporting information exchange between an electronic device and an external device, which is hereafter called 'information exchange application'. The information exchange application is capable of including a notification relay application for relaying specific information to external devices or a device management application for managing external devices.

For example, the notification relay application is capable of including a function for relaying notification information, created in other applications of the electronic device to external devices. In addition, the notification relay application is capable of receiving notification information from external devices to provide the received information to the user.

The device management application is capable of managing (e.g., installing, removing or updating) at least one function of an external device communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment, the applications 970 are capable of including an application (e.g., a health care application of a mobile medical device, etc.) specified attributes of an external device. According to an embodiment, the applications 970 are capable of including applications received from an external device. According to an embodiment, the applications 970 are capable of including a preloaded application or third party applications that can be downloaded from a server. It should be understood that the components of the program module 910 may be called different names according to types of operating systems.

According to one embodiment, at least part of the program module 910 can be implemented with software, firmware, hardware, or any combination of two or more of them. At least part of the program module 910 can be implemented (e.g., executed) by an application processor (e.g., processor 810). At least part of the programing module 910 may include modules, programs, routines, sets of instructions or processes, etc., in order to perform one or more functions.

The term "module" used in the disclosure may refer to, for example, a unit including at least one combination of hardware (e.g., circuitry), software, and firmware. The "module" may be interchangeably used with terms such as unit, logic, logical block, component, and/or circuit. The "module" may be an integrally configured component or a standalone unit performing one or more function and/or a part thereof. The "module" may be mechanically and/or electronically implemented. For example, the "module" according to the disclosure may include at least one of processing circuitry (e.g., a CPU), a dedicated processor, an application-specific IC (ASIC) chip, a field-programmable gate arrays (FPGA), and a programmable-logic device for performing operations which has been known and/or are to be developed.

According to one or more embodiments, at least some of the devices (e.g., modules or functions thereof) or the method (e.g., operations) according to the disclosure may be implemented by a command stored in a computer-readable storage medium in a programming module form. When the instructions are executed by at least one processor (e.g., the processor 720), the at least one processor may perform functions corresponding to the instructions. The computer-readable storage medium may be, for example, the memory 730. At least a part of the programming module may be implemented (e.g., executed) by, for example, the processor 720. At least some of the programming modules may include, for example, a module, a program, a routine, a set of instructions or a process for performing one or more functions.

The computer-readable recording medium may include magnetic media such as a hard disk, a floppy disk, and a magnetic tape, optical media such as a compact disc ROM (CD-ROM) and a DVD, magneto-optical media such as a floptical disk, and hardware devices specially configured to store and perform a program instruction (e.g., programming module), such as a ROM, a RAM, a flash memory and the like. In addition, the program instructions may include high class language codes, which may be executed in a computer by using an interpreter, as well as machine codes made by a compiler. The aforementioned hardware device may be configured to operate as one or more software modules in order to perform the operation of the disclosure, and vice versa.

The module or programming module of the disclosure may include at least one of the aforementioned components with omission of some components or addition of other components. The operations of the modules, programming modules, or other components may be executed in series, in parallel, recursively, or heuristically. Some operations may be executed in different order than those disclosed, omitted, or extended with other operations.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

As described above, the electronic device and grip recognition method of the present disclosure is advantageous in terms of determining whether the electronic device is being gripped by a user based on the change in the transmit power measured by means of a coupler to the antenna. Therefore, a separate and expensive grip sensor is not required.

Therefore, the electronic device and grip recognition method of the present disclosure is advantageous because they provide grip detection functionality without increasing circuit complexity and device manufacturing costs.

Further, the electronic device and grip recognition method of the present disclosure is advantageous because they protect against potential antenna performance degradation caused by a separate grip sensor.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device, comprising:
   an antenna;
   a power detector;
   a power amplifier;
   a processor electrically coupled to the antenna, the power detector, and the power amplifier; and
   a memory electrically coupled to the processor;
   wherein the memory stores instructions that, when executed by the processor, cause the processor to:
   transmit a radio signal through the antenna at a first transmit power value;
   detect, using the power detector, the first transmit power value outputted from the power amplifier being changed to a second transmit power value;
   in response to the second transmit power value output from the power amplifier being greater than a predetermined value, and the second transmit power value being maintained over a predetermined period, determine that the electronic device is being gripped and adjust the second transmit power value to below a predetermined level.

2. The electronic device of claim 1, wherein the instructions further cause the processor to measure, if the second transmit power value outputted from the power amplifier is greater than the predetermined value, a distance between the electronic device and an external object based on a change of the first transmit power value, and adjust the second transmit power value based on the measured distance between the electronic device and the external object,
   wherein the memory further store a power level table mapping transmit power levels to distances between the electronic device and the external object, and wherein the distance between the electronic device and the external object is determined from the transmit power level.

3. The electronic device of claim 2, wherein the instructions further cause the processor to:
   retrieve a transmit power level from the power level table based on the measured distance; and
   adjust the second transmit power value outputted from the power amplifier to the retrieved transmit power level.

4. The electronic device of claim 1, wherein the electronic device is clad in a metal housing.

5. The electronic device of claim 1, wherein the antenna, the power detector, and the power amplifier are arranged in series with the power detector disposed between the antenna and the power amplifier.

6. The electronic device of claim 1, wherein the instructions further cause the processor to:
   convert the second transmit power value detected using the power detector to a digital value; and
   adjust, if the converted digital value corresponding to the second transmit power value is greater than the predetermined value, the second transmit power value.

7. A grip recognition method of an electronic device, the method comprising:
   transmitting a radio signal through an antenna at a first transmit power value;
   detecting, using a power detector, the first transmit power value outputted from a power amplifier being changed to a second transmit power value; and
   in response to the second transmit power value output from the power amplifier being greater than a predetermined value, and the second transmit power value being maintained over a predetermined period:
   determining that the electronic device is being gripped; and
   adjusting the second transmit power value to below a predetermined level.

8. The method of claim 7, further comprising:
   measuring, if the changed second transmit power value outputted from the power amplifier is greater than the predetermined value, a distance between the electronic device and an external object based on a change of the first transmit power value; and
   adjusting the second transmit power value based on the measured distance between the electronic device and the external object.

9. The method of claim 7, wherein adjusting the second transmit power value comprises:
   retrieving a transmit power level mapped to the measured distance from a power level table stored in a memory; and
   adjusting the second transmit power value outputted from the power amplifier to the retrieved transmit power level.

10. The method of claim 7, wherein the antenna, the power detector, and the power amplifier are arranged in series with the power detector disposed between the antenna and the power amplifier.

11. The method of claim 7, wherein an external object comprises a body part.

12. The method of claim 7, wherein adjusting the second transmit power value comprises:
    converting the changed second transmit power value detected using the power detector to a digital value; and
    adjusting, if the converted digital value corresponding to the changed second transmit power value is greater than the predetermined value, the second transmit power value.

* * * * *